United States Patent [19]

Miller

[11] Patent Number: 4,559,235

[45] Date of Patent: Dec. 17, 1985

[54] LOW TEMPERATURE DEHYDRATED ALFALFA PRODUCT AND METHOD AND APPARATUS FOR PROCESSING SAME

[75] Inventor: John T. Miller, Roll, Ariz.

[73] Assignee: Miller Dehydrator International, Inc., Roll, Ariz.

[21] Appl. No.: 380,147

[22] Filed: May 20, 1982

[51] Int. Cl.$^4$ .............................................. A23K 1/00
[52] U.S. Cl. .................................. 426/636; 426/518; 426/520; 426/807
[58] Field of Search ............... 426/635, 636, 623, 630, 426/74, 72, 807, 518, 520; 34/82, 216

[56] References Cited

U.S. PATENT DOCUMENTS

| | | | |
|---|---|---|---|
| 1,005,392 | 10/1911 | Wilson | 426/636 |
| 1,788,099 | 1/1931 | Fulmer | 34/216 |
| 2,198,214 | 4/1940 | Musher | 426/636 |
| 2,227,246 | 12/1940 | Chuck | 426/636 X |
| 2,274,905 | 3/1942 | Lewis | 426/636 |
| 2,504,159 | 4/1950 | Singer et al. | 426/636 X |
| 2,659,161 | 11/1953 | Eaves | 34/216 X |
| 3,044,877 | 7/1962 | Lent | 426/636 X |
| 3,063,839 | 11/1962 | Simonet et al. | 426/636 X |
| 3,557,799 | 1/1971 | Koch et al. | 131/312 |
| 3,775,133 | 11/1973 | Batley | 426/636 |

OTHER PUBLICATIONS

Morrison, "Feeds and Feeding", Morrison Publishing Co., Ithaca, N.Y., 1957, pp. 8 and 57-60, 296-305 and 1000-1003.

*Primary Examiner*—R. B. Penland
*Attorney, Agent, or Firm*—Cahill, Sutton & Thomas

[57] ABSTRACT

Freshly cut green-chopped alfalfa is fed into an elongated lightproof dryer, conveyed on successively slower moving perforated conveyor belts in successively thicker layers through successive regions through which decreasing amounts of air heated to respective constant temperatures in the range from roughly 150° F.–600° F. are moved. During daytime operations, a very large solar collector preheats the air, and natural gas powered burner units bring the preheated air up to the respective constant temperatures. At the outlet end of the dryer dehydrated alfalfa is dropped into a first chute which feeds a layer of dehydrated alfalfa through a first crushing system including a pair of high pressure rollers, which crush it, fracturing and breaking the leaves of the alfalfa. This alfalfa then is fed into a second chute which mixes it and feeds it between another pair of high pressure rollers that further break the brittle leaf pieces. The alfalfa then is conveyed to the top of a first separator system that separates the stem pieces from the leaf pieces.

6 Claims, 16 Drawing Figures

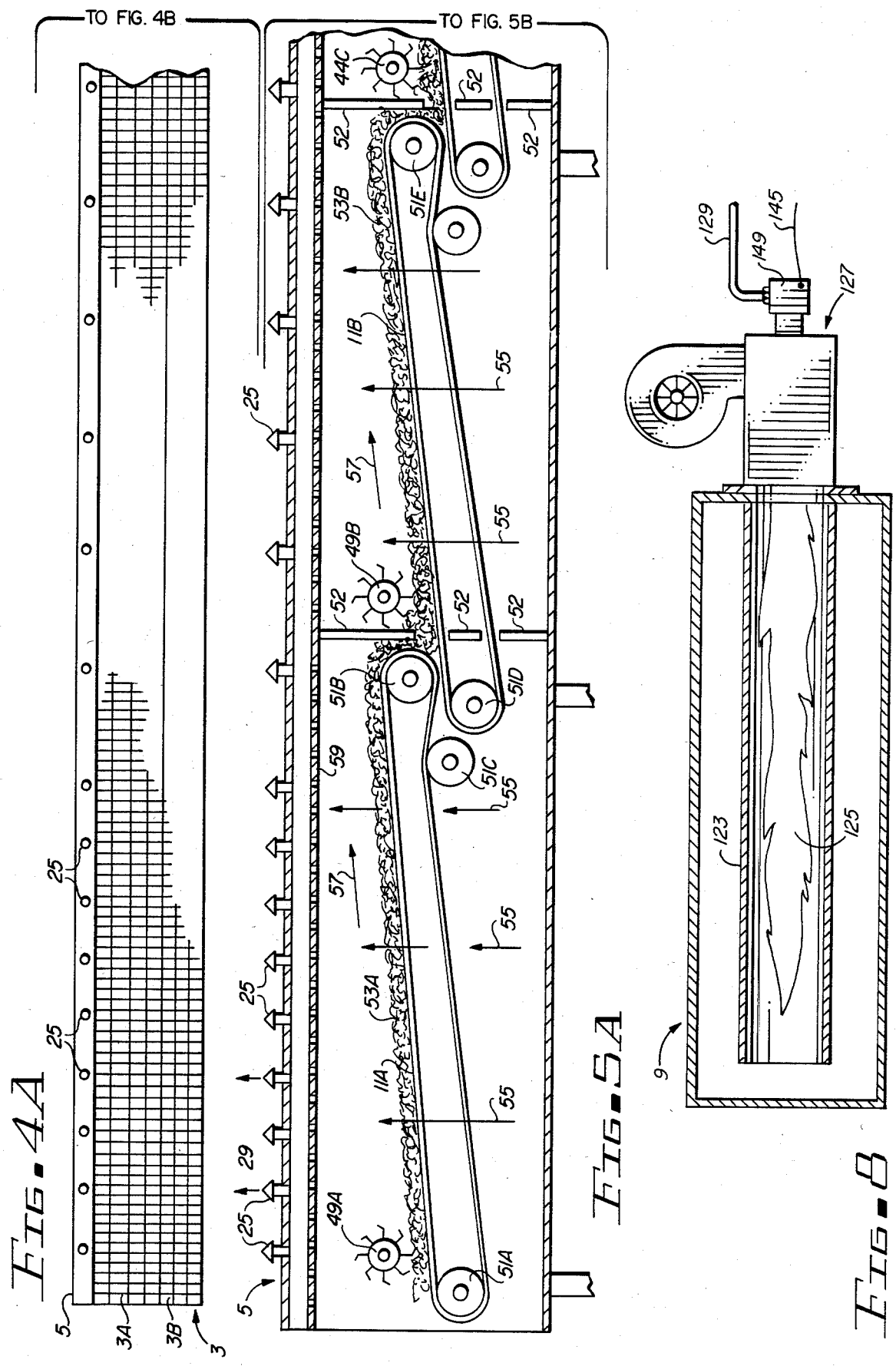

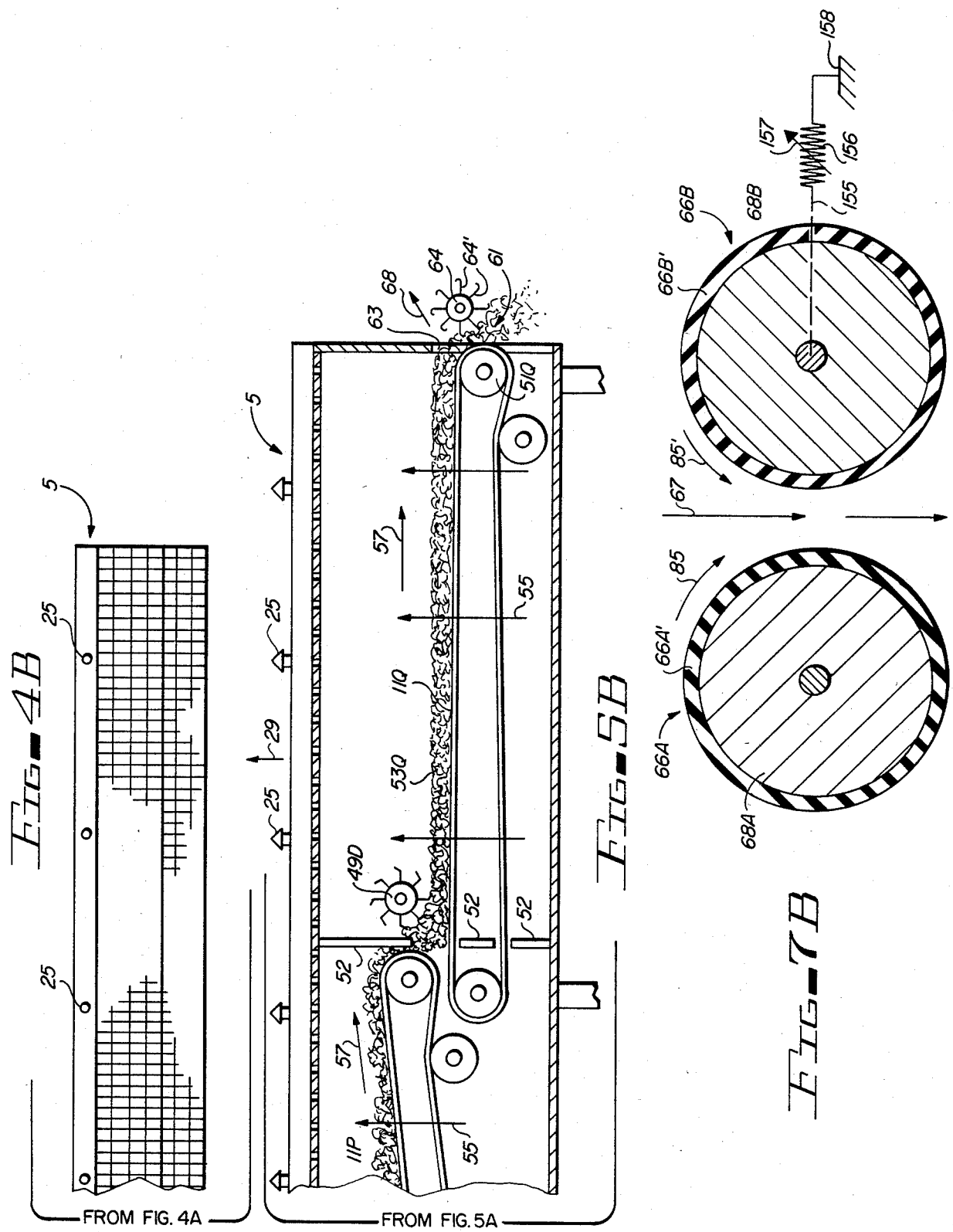

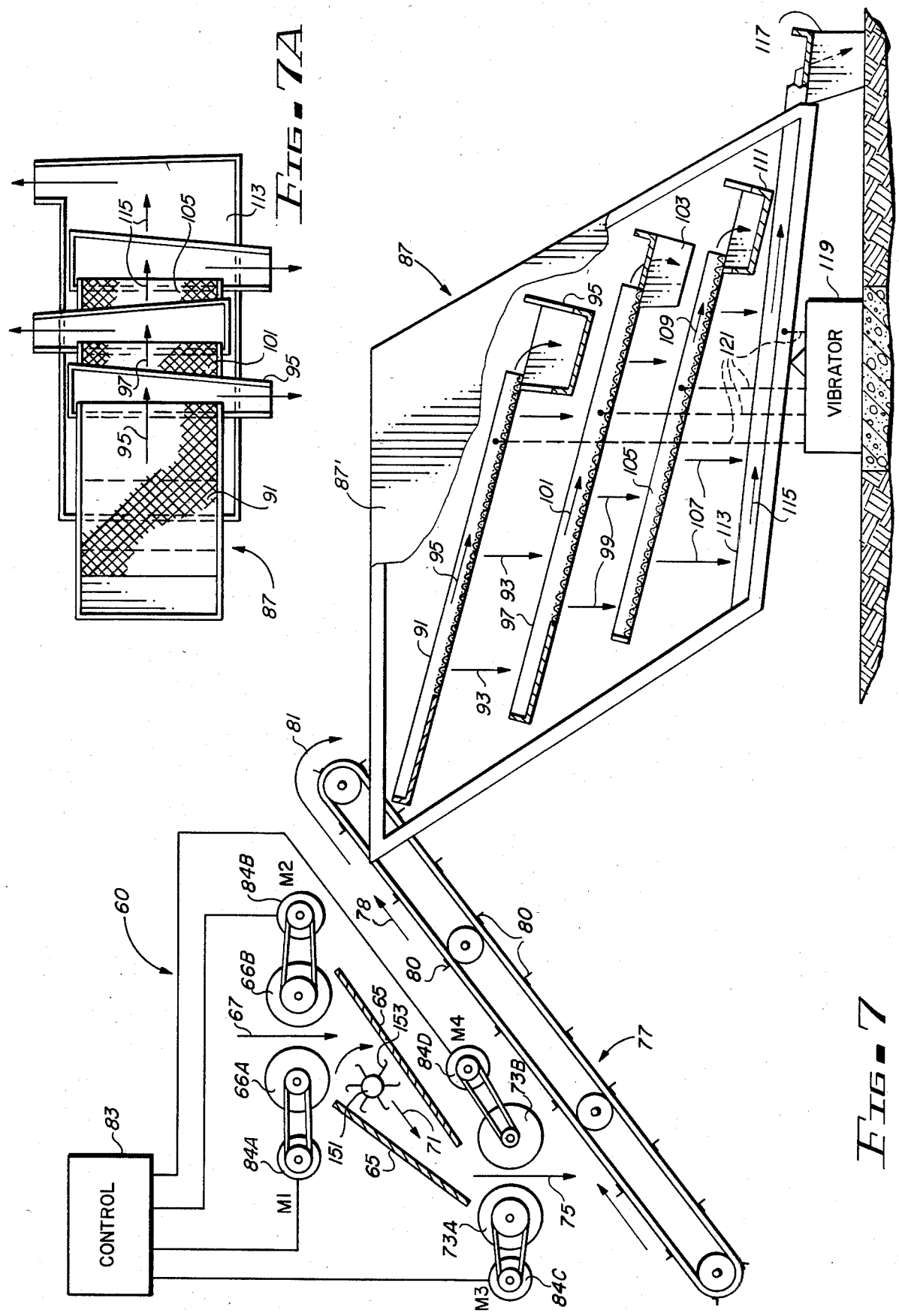

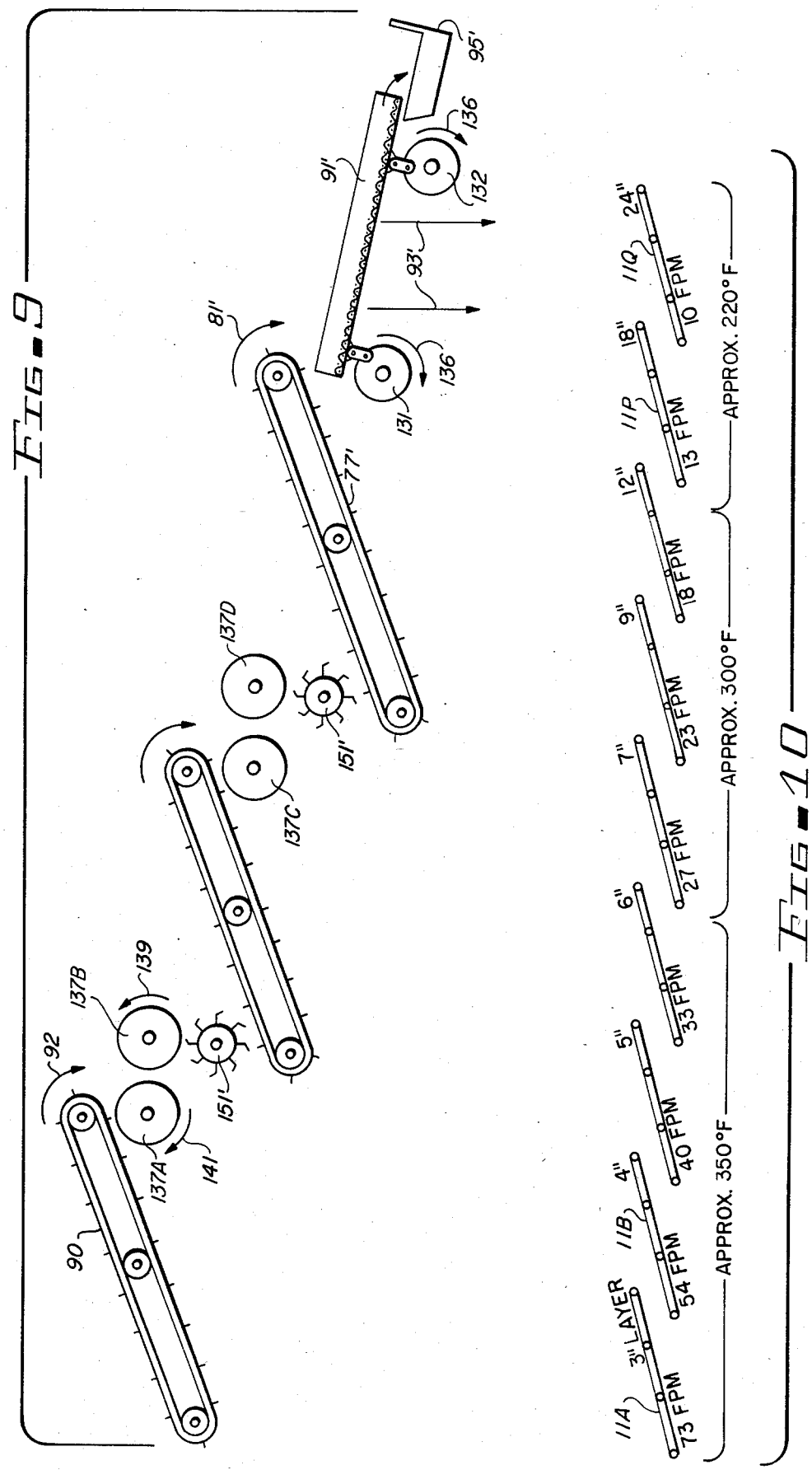

LOW TEMPERATURE DEHYDRATED ALFALFA PRODUCT AND METHOD AND APPARATUS FOR PROCESSING SAME

BACKGROUND OF THE INVENTION

The invention relates to dehydrated agricultural products, including dehydrated alfalfa products, and also relates to processes and apparatus for making the dehydrated agricultural products, especially dehydrated alfalfa, and also to apparatus and processes for separating stem and leaf pieces of dehydrated alfalfa.

Conventional methods of harvesting alfalfa put farmers at the mercy of the weather. Alfalfa must be properly dried before it is baled or otherwise processed and stored. Dehydrating devices powered by fossil fields, especially natural gas, long have been utilized to dehydrate alfalfa. Natural gas powered dehydrating systems are commonly used in the United States, but most of the presently operating systems were installed thirty to fifty years ago. In most of these old systems, the air which dehydrates the alfalfa is heated to temperatures of roughly 1600° F. Such high air temperatures rapidly dehydrate gas fuel has risen so high that now there is a great trend in the alfalfa dehydrating industry to allow freshly cut hay to lie on the field as long as possible in order to partially dry it before removing it from the field and passing it through the dehydrator. This is recognized in U.S. Pat. No. 4,193,208 which notes that as fuel costs have increased, it has become common practice to rely more heavily on the benefits of some field curing, notwithstanding the risk of damage or loss resulting from leaving the cut crop in the field during the curing processes, simply because this technique greatly reduces the moisture content of the crop presented to the dehydrator, and consequently lowers the cost of the natural gas required to complete the drying process.

Unfortunately, there are significant disadvantages to using the alfalfa field as a "curing pad" for freshly cut alfalfa. For example, in some parts of the United States, the yearly amount of crop growing time lost as a result of using the field as a curing paid is a large portion of the time required to grow one or more crops. For example, in Yuma, Ariz., as many as ten alfalfa crops per year could be grown and harvested the alfalfa is swathed (i.e., mown and wind rowed) and is immediately "green-chopped" and removed from the field. Using of the field as a "curing pad" for completely or partially sun drying the alfalfa crop for several days for each crop results in a substantial loss of time that could otherwise be used for growing more alfalfa as soon as the previous crop is cut. (Obviously, the field cannot be irrigated while it is being used as a curing pad.)

Furthermore, sun drying, i.e., field curing, of alfalfa causes a great reduction in the nutrient value of alfalfa, sharply reducing the market price which can be obtained for the final product. For example, several of the important nutrients, including chlorophyll, xanthrophylls and Vitamin A deteriorate rapidly as a result of exposure to sunlight and moisture. Sun drying also degrades the color of alfalfa, which greatly reduces its market price. Those skilled in the art know that the color of alfalfa products is very important to buyers because color is known to be a general indicator of the overall quality and nutrient content of alfalfa. Furthermore, alfalfa that is being "field cured" is subject to accumulatihg additional moisture, either in the form of dew or rain. It is well known that when such moisture evaporates due to the sun's rays, a very pronounced bleaching away of the color and nutrients occurs. The exposed stems and leaves both loose substantially all of their green color and a great amount of their nutrient content.

Another shortcoming of completely drying cut alfalfa using the field as a curing paid is that the alfalfa leaves become dry and brittle faster than the stem material and become subject to shattering. For example, a few hours after the alfalfa has been mowed or swathed, the leaves will be dry and brittle enough that an appreciable number of them will break off when the alfalfa is again handled, or even if a strong wind occurs. The subsequent further handling of the brittle crop material, for example, to remove it from the field and finish dehydrating it in a conventional gas fired dehydrating system, causes the brittle leaves to break, and fall to the ground and be lost.

Since the leaf material has a much higher concentration of a number of important nutrients than the stem material, the loss represents a loss of a portion of the most valuable part of the alfalfa crop. Since alfalfa stem material has a substantially higher percentage fiber content than alfalfa leaf material, the loss of leaf material in this fashion results in a higher percentage of stem material content, and hence, fiber content of the total harvested crop, and a lower nutrient content.

Some agricultural experts estimate that the loss of potential weight of alfalfa product produced due to use of an alfalfa field as a curing pad can be as high as 20% to 30% per year.

Another problem that is caused by partially curing alfalfa in the field is caused by the fact that the moisture content of field cured crops may be reduced from approximately 80% down to roughly 50%: this amount of moisture is simply not sufficient to protect the partially dried alfalfa against severe combustion and degradation under the influence of the high air inlet temperatures of all conventional natural gas fired dehydrators.

It has been found that the high temperatures to which most dehydrated alfalfa is actually exposed in known conventional natural gas fired dehydrators causes a significant deterioration in some of the important nutrients of alfalfa, including Vitamin A (carotene), xanthophylls, protein, calcium, phosphorous, arginine, and lysine. Arginine and lysine are essential amino acids. Vitamin A (carotene) is important, contribúting to fertility of many animals and poultry.

The importance of avoiding destruction of the nutrient value of alfalfa can perhaps be better appreciated when it is realized that before dehydration, and before exposure to excessive sunlight, alfalfa leaves have very high protein content. It is not as high as soybeans, the meal of which has approximately 44%–49% protein, but nevertheless, alfalfa leaves contain roughly 30% protein. Soybeans are efficiently grown only in certain climates, South America, and the United States being the two largest soybean producing areas of the world. Soybean crops are grown and harvested only once per year. In contrast, alfalfa can be grown in many parts of the world, including both the hotter climates and the colder climates. In the colder climates or at higher elevations, several alfalfa crops per year can be grown and harvested. In irrigated desert areas, for instance, Yuma, Arizona, as many as ten alfalfa crops per year can be grown. In the Southwest U.S., the yield of alfalfa per acre can be approximately ten dried tons per year, whereas the maximum yield for soybean crops is approximately one ton per acre per year. Consequently, the amount of protein available from alfalfa is high, and in the future, it can be reasonably expected that not only animal feed products, but other products for human consumption may rely on alfalfa as a protein source. Even for animal feed purposes, the protein content is one of the most important nutrients in alfalfa, and significantly affects market price. Obviously, it is highly desirable that the reduction of content of protein, as well as the other above-mentioned nutrients, that occurs in conventional alfalfa dehydrating processes be substantially reduced.

U.S. Pat. No. 2,659,161 recognizes the need for using relatively low temperature air to dehydrate alfalfa in order to prevent degradation of carotene therein. However, the apparatus and process disclosed is not satisfactory for use in conjunction with economical alfalfa harvesting apparatus and methods because although the apparatus disclosed does preserve nutrients in alfalfa more effectively than field curing processes and conventional high temperature natural gas fired dehydrating processes, the method and apparatus disclosed in U.S. Pat. No. 2,659,161 has not been popular, probably because that process is not an economic way of attaining the higher nutrient values that would be desirable for alfalfa products purchased by the feed buying public. One reason that the processes disclosed in U.S. Pat. No. 2,659,161 is not economic is that it is necessary to remove alfalfa from the field as soon as possible after it is cut in order to enhance the growing time of the subsequent crop and therefore it is highly desirable to begin dehydrating alfalfa as soon as possible after it is cut. To accomplish this, it is necessary that a particular selection of available conventional farm machinery and a particular work force be able to work efficiently at their normal speed without causing the necessity of temporarily storing large amounts of green cut alfalfa for very long times. This means that the alfalfa dehydrating system must be able to receive the freshly cut and chopped alfalfa product approximately as rapidly as it is supplied by the above-mentioned selection of farm machinery and work force.

German Pat. No. 2836526 discloses a device for drying cereal grains. The system disclosed includes a sloped solar panel from which air flows by convection into a drying tower containing a series of mesh baskets containing the cereal grains. Although the device disclosed use convection to move the solar heated air thorough the system, that system would be totally unsatisfactory for dehydrating alfalfa on a commercial basis.

There is clearly an unmet need for an improved high protein alfalfa product which is not exposed to the high temperatures of most natural gas fired dehydrating systems and does not experience the nutrient loss that results from sun curing of cut alfalfa on the field. Since there are various portions of the alfalfa product which are high in fiber, namely the stem portions, and since there are other portions of alfalfa namely the leaves, which are very high in protein, xanthophylls, and Vitamin A among others, which are highly useful in different types of feeds for different types of animals, it would be highly desirable to be able to efficiently separate the leaves having high nutrient content from the high fiber stems of alfalfa in order to attain high protein, low fiber foods for certain animals, such as pigs, poultry etc. and high fiber feeds for other types of animals such as cattle, horses, etc. having large stomachs or multiple stomachs that are capable of digesting high fiber foods.

Accordingly, it is an object of the invention to provide an improved alfalfa product having high nutrient values, including protein, various vitamins, minerals, amino acids, and low fiber.

It is another object of the invention to economically provide different mixtures of alfalfa stem and leaf material to provide desired ratios of fiber and nutrient values for different food purposes.

It is another object of the invention to substantially reduce the cost of dehydrating alfalfa products.

It is another object of the invention to provide dehydrated alfalfa with uniform product characteristics.

It is another object of the invention to provide dehydrated alfalfa products while incurring much lower energy costs than has been possible in the past.

It is another object of the invention to provide high integrity separation processes and apparatus for dehydrating alfalfa.

It is another object of the invention to provide an economical alfalfa dehydrating system and method that avoids excessive deterioration of nutrients in alfalfa.

It is another object of the invention to provide an economical dehydrating system and method for dehydrating agricultural food products.

It is another object of the invention to provide an economical solar powered alfalfa dehydrating system and method that avoids excessive nutrient deterioration in the alfalfa and operates at a substantially constant rate to receive freshly cut and chopped alfalfa and delivered by a preselected group of farm machinery.

It is another object of the invention to provide a dehydrated alfalfa product with higher nutrient proportions than any prior known dehydrated alfalfa product.

It is another object of the invention to provide a dehydrated alfalfa product having lower fiber content than any known prior dehydrated alfalfa product.

It is another object of the invention to provide an improved solar collector structure suitable for efficiently heating incoming air.

It is another object of the invention to increase the total yield per acre of alfalfa and total production of nutrients per acre of alfalfa.

SUMMARY OF THE INVENTION

Briefly described, and in accordance with one embodiment thereof, the invention provides a dehydrated alfalfa product having very high nutrient content and accurately separated into stem and leaf categories, and an apparatus and low temperature process for dehydrating freshly cut and chopped alfalfa to produce the dehydrated alfalfa without causing excessive heating of alfalfa leaves or stems. Apparatus and method are disclosed for crushing the dehydrated alfalfa in such a manner as to break the leaves into numerous small leaf pieces without causing appreciable breaking of the stem pieces. The stem pieces and leaf pieces then are accurately separated. In the described embodiment of the invention, freshly cut and chopped moist alfalfa is delivered from the field at a relatively constant rate and is metered into a conveyor system within a lightproof dryer that is approximately 1100 feet long. The conveyor system includes a plurality of porous conveyor belts, each of which moves slower than the preceding one, and each of which drops the layer of alfalfa being carried thereon onto the beginning of the succeeding belt, mixing the alfalfa being dropped and depositing it in a thicker layer on the succeeding belt. During daylight operations, outside air is drawn through and is preheated by a very large sloped solar collector system that is approximately 1100 feet long and includes an upper region bounded by a tempered glass plate and a corrugated black metal collector. The conveyor system also includes a lower region bounded by the bottom surface of the metal collector and a gunnite floor which is supported by a large sloped earthen mound that performs an insulative function. Air is drawn through a filtered inlet at the lower end of the sloped collector and up through separate channels in the sloped solar collector system. This air moves partly by convection and partly by a negative pressure air system including plural exhaust units installed in the roof of the dryer housing. The solar preheated air passes from separate channels in the solar collector system into separate corresponding gas powered burner systems which respectively further heat the solar preheated air to predetermined constant temperatures.

The heated air from the gas burner systems is drawn into the elongated dryer and then is drawn transversely through the porous conveyor belts and the freshly chopped alfalfa thereon and is exhausted from the dryer by means of the exhaust units. The constant temperatures and the air flow rates of the heated air thorough the successive separate channels of the solar collector, the corresponding successive separate burner systems, and the successive corresponding separate regions through which the conveyor belts pass decrease from the inlet end of the dryer to the outlet end thereof, so that larger volumes of higher temperature air pass transversely through thinner layers of faster moving, more moist alfalfa near the inlet end of the dryer. Lower volumes of lower temperature air pass transversely through thicker layers of more slowly moving alfalfa near the outlet end of the dryer. The air flow rates of the heated air, the maximum constant temperatures, the conveyor belt speeds, and the thicknesses of the alfalfa layers on the respective conveyor belts are selected so that, in each region of the dryer through which an alfalfa layer passes, none of the alfalfa therein exceeds a temperature which would cause an unacceptable deterioration of a particular nutrient or group of nutrients in that alfalfa.

In the described embodiment of the invention, an auger screw positioned in a trough along the length of the bottom of the dryer shed continually turns to convey small alfalfa leaf pieces which become more rapidly dried than others and break loose from the stems and fall through the porous conveyor belts into the trough at the bottom of the dryer shed. This removal of such dried, separated alfalfa leaves prevents them from being exposed to high temperatures long enough to cause unacceptable deterioration of various nutrients therein.

Dehydrated alfalfa expelled at the outlet end of the dryer consists mainly of dried stems with leaves attached, since the "handling" of the alfalfa by the dehydrating system up to this point has been quite "gentle". This dehydrated alfalfa is fed into a region between two rubber covered rollers which crush the resulting layer of dehydrated alfalfa with a relatively high pressure that breaks, or at least extensively fractures, the leaves but causes minimum breakage of the stem pieces. This layer of dehydrated alfalfa is tumbled by means of a chute into a region between a second pair of similar rollers and is again crushed. The resulting stresses on the reoriented, already weakened alfalfa leaves causes them to be further shattered or broken into numerous leaf pieces, facilitating accurate and efficient subsequent separation of stem pieces from leaf pieces.

This alfalfa is conveyed to a first screen which supports the small leaf pieces and large stem pieces. The separated leaf pieces then are fed into a third pair of rollers that are similar to the first pair and are again crushed and are thereby further weakened and/or broken. The crushed leaf material then is tumbled into a further pair of rollers. This even further breaks the leaf pieces into smaller leaf pieces. The resulting product then is fed into a second screen separator apparatus for further separation. The subsequent separation of stem pieces and leaf pieces is achieved by means of a multiple sloped-screen structure which is caused to vigorously vibrate, causing smaller stem pieces and different leaf pieces of dehydrated alfalfa to be accurately separated into different categories.

The avoidance of high temperatures and exposure to sunlight of the alfalfa during the dehydrating process and the accurate separation of stem and leaf material results in separated leaf material with very high proportions of protein, arginine, lysine, calcium, phosphorous, xanthophylls, and Vitamin A, and with very high metabolizable energy. The above process also results in a high fiber separted stem material having approximately as high a protein percentage as standard commercially available 17% dehydrated alfalfa. This high fiber stem material also has substantially more fiber than standard 17% dehydrated alfalfa. In one embodiment of the invention, some of the freshly cut and chopped alfalfa is squeezed to obtain a quantity of alfalfa juice which is used instead of water as an additive and also as a binder to make high nutrient alfalfa pellets out of the dehydrated and separated alfalfa materials.

BRIEF DESCRIPTION OF THE DRAWINGS

FIGS. 4A and 4B constitute a plan view of the dehydrating system of FIG. 1.

FIGS. 5A and 5B constitute a partial section view of the dryer section of the dehydrating system of FIG. 1.

FIG. 7 is an elevational schematic cutaway view of the crusher of FIG. 6 and a separating system.

FIG. 7A is a plan view of the separator shown in FIG. 7.

FIG. 7B is a section view of a pair of the rollers contained in the crusher of FIGS. 6 and 7.

FIG. 8 is a partial cutaway perspective view of a forced flow gas burner system used in the dehydrating system of FIG. 1.

FIG. 9 is a schematic diagram of part of a modified crushing and screening system.

FIG. 10 is a diagram useful in explaining the conveyor system shown in FIGS. 5A and 5B.

DESCRIPTION OF THE INVENTION

Figure 1:
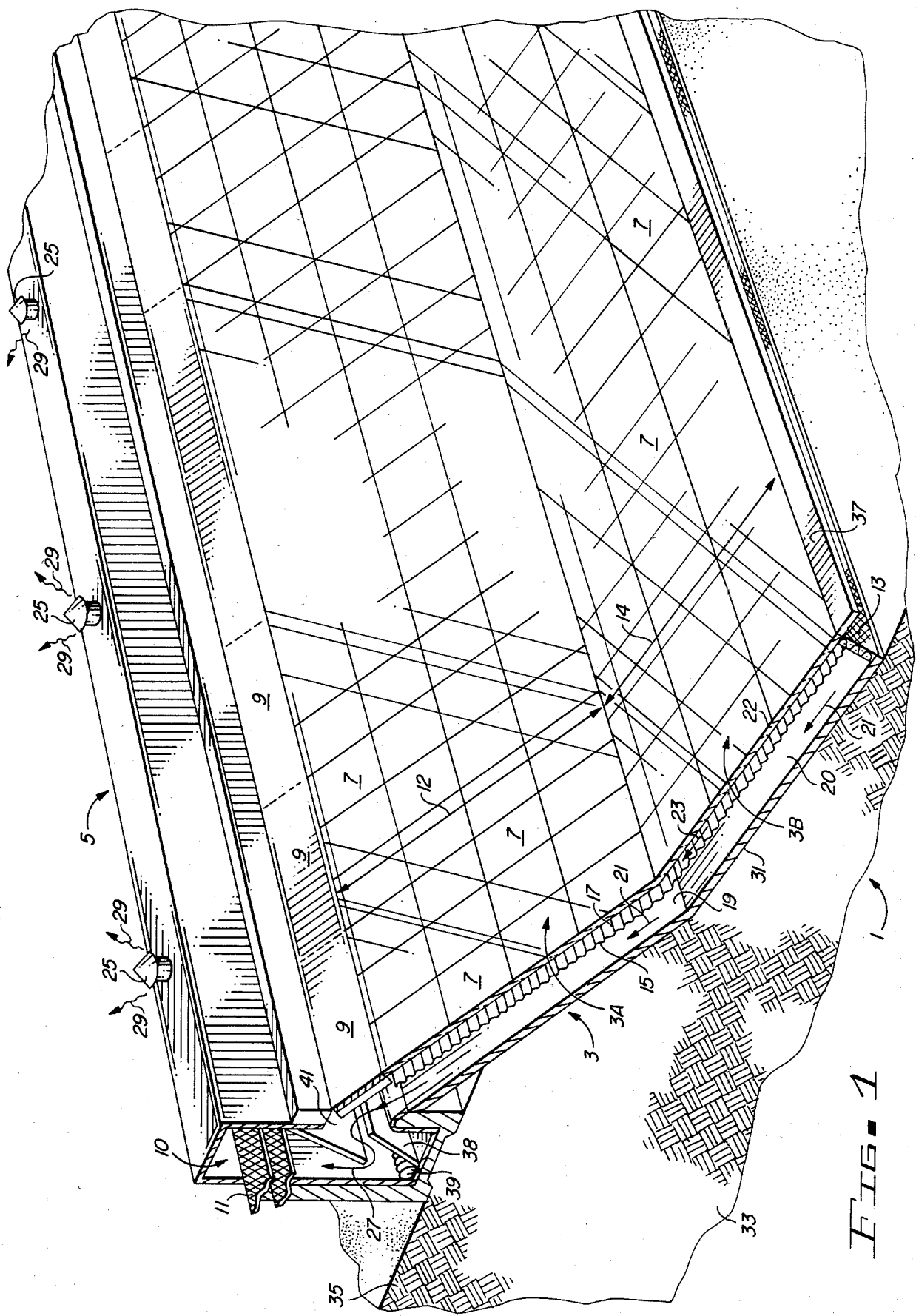
FIG. 1 is a partial perspective section view of the dehydrating system of the present invention.

Referring now to FIG. 1, dehydrating system 1 includes a large solar collector 3 and an elongated drying shed 5, hereinafter referred to simply as dryer 5. FIGS. 4A, 4B, 5A and 5B illustrate the extent of dehydrating system 1 more clearly than FIG. 1, which shows only a partial perspective section view. Referring to FIGS. 4A, 4B, 5A and 5B, the lengths of both the solar collector section 3 and the dryer 5 each are approximately 1100 ft. for the presently preferred embodiment of the invention. The solar collector section 3 has two differently sloped portions 3A and 3B. The angle of inclination of section 3A is 43° (for a facility installed near Yuma, Ariz.) and the angle of inclination of portion 3B is 20°. The dimension indicated by reference numeral 12 in FIG. 1 is approximately 24 ft. and the dimension indicated by reference numeral 14 is approximately 18 ft. Note that the angles of 20° and 43° were selected partly on the basis of historical data for weather,alfalfa crop yields, and number of working hours per day in the Yuma area in such a way as to minimize the amount of natural gas used to dehydrate alfalfa over a one-year period, which includes the "fast growing" summer months (wherein the number of harvestings is greater) and the "slow growing" winter months (wherein the number of harvestings is small).

The solar collector section 3 is constructed on a built-up earthen mound 33, which performs an insulation function, in addition to supporting solar collector section 3. The collector surface includes a plurality of 34 inch long by 76 inch wide panels such as 7, each of which is composed of low iron tempered safety plate glass that is one-eighth of an inch thick, with an inner pebbled surface. Each glass plate 7 is mounted within a metal frame and is sealed with respect to the metal frame by means of a conventional long-life rubber-like gasket. There is enough flexibility in the rubber gaskets to accommodate thermal shrinkage and expansion as the temperature of the glass plates 7 vary during the range of normal daytime and night time temperatures. The bulk and elasticity of the rubber gaskets also prevents sufficient stresses from being applied to the glass plates 7 to cause them to shatter during minor earth quake tremors. (The structure,including the gaskets for mounting the tempered glass plate, is not shown in detail because it is widely used in the solar collector industry.)

Figure 3:
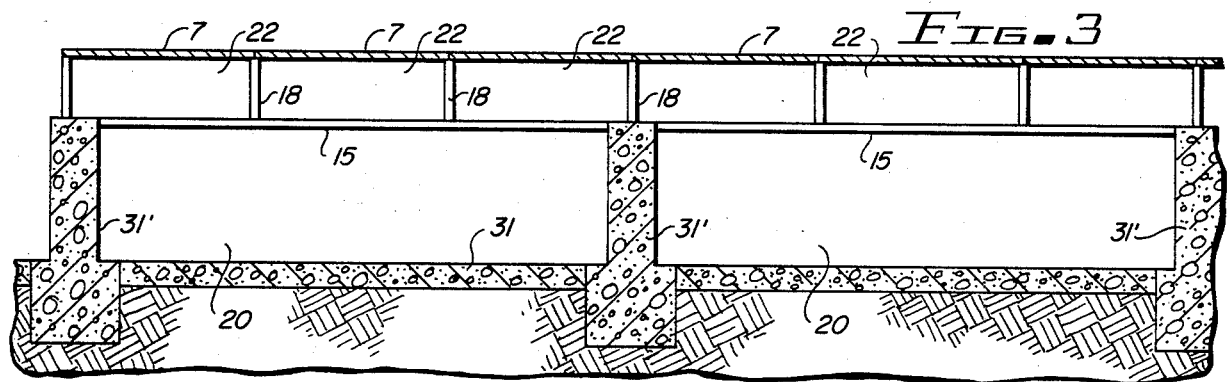
FIG. 3 is a section view taken along section line 3—3 of FIG. 1.

Referring to both FIGS. 1 and 3, the bottom layer of the solar collector structure is composed of a layer 31 of reinforced gunnite which is approximately one and one-half inches thick. Above the layer of insulating gunnite 31 is a region 20 through which air flows through channels formed by concrete walls 31' (FIG. 3) in the direction indicated by arrows 21 (FIG. 1) from the inlet through air filter 13 up to the inlet of gas burner systems 9. A black corrugated collector plate 15 supported by concrete walls 31' divides region 20 from an upper region 22 through which air from inlet filter 13 flows through channels formed by metal dividers 18 (FIG. 3) indicated by arrow 23 (FIG. 1). As best seen in FIG. 3, corrugated collector plate 15 is supported on concrete walls 31'. Three glass plates 7 span the distance between each pair of walls 31'. Vertical metal dividers 18 extend down to either collector plate 15 or concrete wall 31', as shown. The glass plates 7 are supported by the metal dividers 18 and are sealed thereto by means of the above-mentioned rubber gaskets, as is conventional in solar collectors.

The corrugations (FIG. 1) in collector plate 15 are provided, in accordance with standard practice in the solar collector industry, to promote turbulence in the air as it moves in the directions indicated by arrows 21 and 23 in regions 20 and 22, respectively. This causes the air to "tumble", and exposes more air to the hot black corrugated surface of collector plate 15 and thereby improves the efficiency of transfer of heat from the collector plate 15 to the moving air in regions 20 and 22. In accordance with standard practice, use of a pebbled inner surface of the glass plates 7 tends to prevent re-radiation of heat energy absorbed by collector plate 15, thereby improving the efficiency of solar collector 3.

As shown in FIG. 1, a lower lip 37 extends downward from the lower edge of the lowest row of glass plates 7 in order to prevent dust and rain water coming into contact with the filter material of inlet air filter 13, and also prevents the sun from contacting and thereby degrading the filter material. Furthermore, in accordance with the described embodiment of the invention, a system is incorporated into dehydrator system 1 for periodically releasing water at the upper end of solar collector 3 to wash dust off of the glass plates 7 in order to allow more solar energy to pass through them (although the efficiency of solar collector 3 remains quite efficient even if there is quite a bit of dust on the outer surfaces of glass plates 7). Lip 37 prevents this water from coming into contact with inlet filter 13.

In accordance with the present invention, each of the glass plates 7 is composed of tempered high strength safety glass of the type commonly used in sliding doors and residences. This type of glass will withstand a great amount of impact without shattering and if the glass does shatter, the plate nevertheless usually remains intact.

In accordance with the described embodiment of the invention, the depth of region 20 of solar collector 3 is approximately 18 inches and the depth of region 22 is approximately 6 inches. These depths exceed the depths commonly used in solar collectors. Most solar collectors use insulation behind the collector plate. Furthermore, the widths indicated by dimensions 12 and 14 considerably exceed dimensions commonly used in the solar collector industry, at least for purposes of heating water. Engineers skilled in the solar collector art have expressed the opinion that depths greater than approximately 3½ inches and widths (such as those indicated by dimensions 12 and 14) greater than approximately twelve feet would result in "rapidly diminishing returns" in terms of the increases achieved in the temperature to which air can be heated.

However, my experiments have shown that increasing both the depths of regions 20 and 22 and also the dimensions indicated by reference numerals 12 and 14 in FIG. 1 does indeed, substantially increase the temperature to which the air is heated beyond what was predicted by the solar collector experts whom I have engaged as consultants in conjunction with certain aspects of the dehydrator system 1.

It should be noted that my dehydrating process requires very large amounts of relatively low temperature heated air (compared to the conventional alfalfa dehydration systems, which use relatively small amounts of very high temperature air). By providing the above-described solar collector structure with much greater depth than is conventional for solar air heaters, air movement in the solar collector is very slow, giving it more time to heat up to a higher temperature. This, plus increasing of the widths indicated by reference numerals 12 and 14 in FIG. 1, increases the volume of air expansion and enhances the upward movement of the heated air by convection due to the increased "chimney effect" of the structure.

It should be noted that the air temperature in upper region 22 in the solar collector structure is usually heated to a higher temperature, because it is not shaded by the collector plate 15, and because the same collector plate area has a lesser volume of air to heat in region 22 then in region 20. However, since region 22 is exposed to the outer glass plates 7, outside wind will cause a much more rapid cooling of the air in region 22 than if the larger volume of air in region 20, which is in effect "insulated" from glass plates 7 by region 22. Furthermore, the cement floor 31 and cement walls 31' and the earthen mound 33 provide temporary heat storage that helps maintain the temperature of air in region 20 constant. The larger, but lower temperature volume of air in region 20 thus is less subject to sudden changes in temperature due to wind, a passing cloud, etc.

Figure 1A:
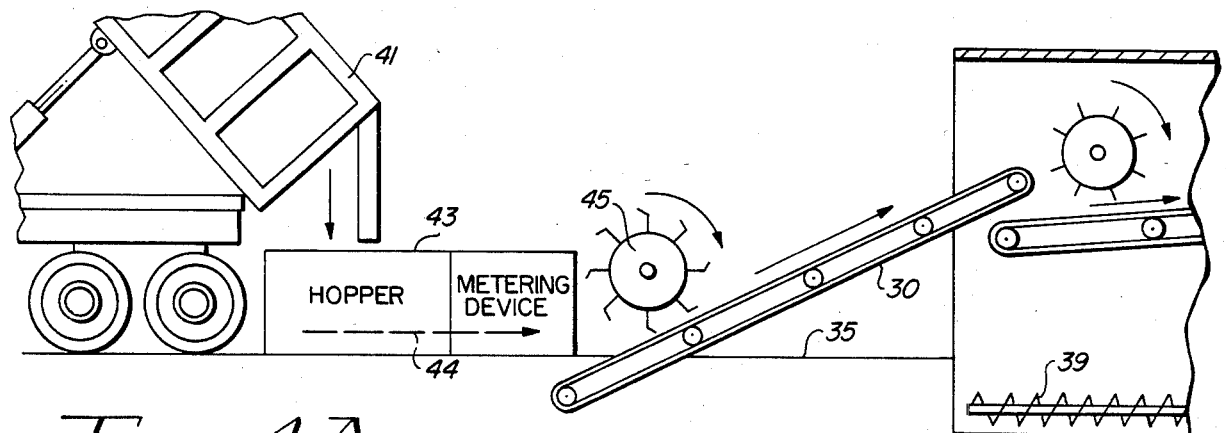
FIG. 1A is an elevational view of an apparatus for conveying chopped alfalfa to the dehydrating system of FIG. 1.
Figure 1B:
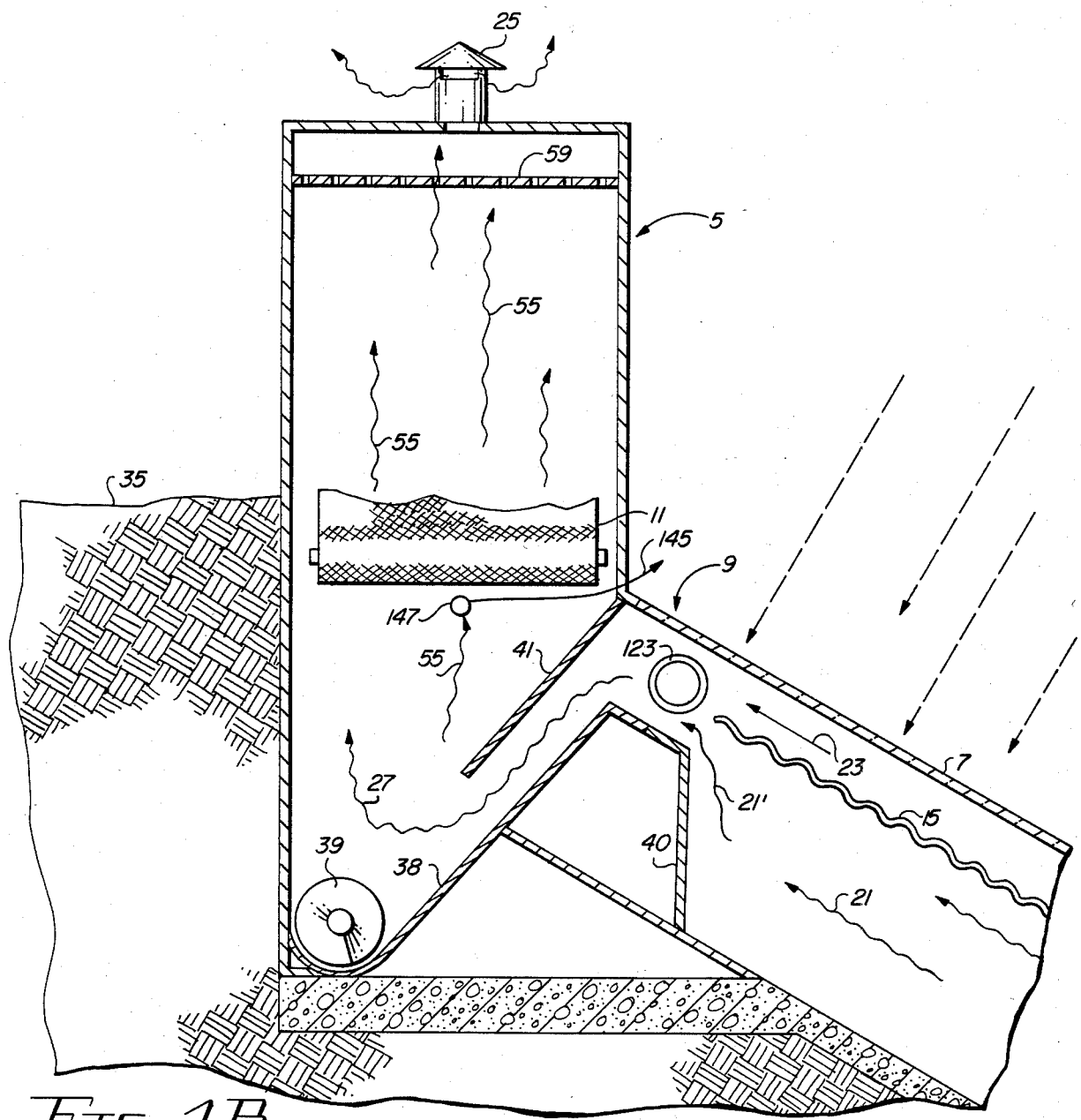
FIG. 1B is a partial section view of the dryer portion of the dehydrating system of FIG. 1.

At the upper end of the solar collector 3, a plurality of gas burner sections 9 are installed to further heat the solar preheated air flowing through regions 20 and 22 of solar collector 3. Each of the gas burner sections 9 is separate from the others, and each receives the solar preheated air flowing between a pair of adjacent concrete walls 31' (FIG. 3) spanned by adjacent "columns" of glass plates 7. FIG. 1B and FIG. 8 show the salient features of the presently preferred embodiment of each of the gas burner sections 9, in which a forced flame natural gas burner unit 127 (which can be implemented by means of an "Econo-Pak" burner unit manufactured by Elipse, Inc. of Rockford, Ill.) forces a flame 125 (FIG. 8) through a steel tube 123. Steel tube 123 can have a diameter of approximately five inches, and the portions of gas burner section 9 serving as duct walls above and below steel tube 123 can have a separation of approximately ten inches. Reference numeral 129 designates the natural gas feed line to burner unit 127. (Of course, other burner units, such as atmospheric burner units, could be alternatively used. The term "gas" as used herein includes gas formed by evaporation of any liquid or solid fuel.

Temperature sensors in the dryer 5, subsequently described, sense the temperature of heated air entering dryer 5 to dehydrate freshly chopped alfalfa being conveyed therethrough on conveyor belts generally designated by reference numeral 11. The measured temperatures of the heated air (in the respective regions in dryer 5) are used to control the amounts of natural gas fed to the respective gas burners 127 (FIG. 8) in the respective gas burner sections 9 to bring the solar preheated air therein up to corresponding constant preselected temperatures.

As indicated in FIG. 1 and FIG. 1B, the outlets of the respective burner section 9 are separated from the lower portion of the interior of dryer 5 by a pair of inclined deflector plates 38 and 41, which prevent any dust or alfalfa material inside dryer 5 from entering the burner chambers, wherein the dust might ignite. Arrow 27 in FIGS. 1 and 1B indicates the general direction of flow of solar preheated air through the burner sections 9 downward through the gap between deflector plates 41 and 38 and upward through the perforated conveyor belt 11 of dryer 5. This flow of air at a relatively high velocity out of the relatively narrow gap (approximately 6 inches) between deflector plates 41 and 38 also tends to prevent dust and alfalfa particles from entering the combustion chambers of burner sections 9.

A plurality of sensors 147 (FIG. 1B) are mounted in the path of the heated air indicated by reference number 55 just below the various conveyor belts to monitor the temperature of the heated air passing through the moist alfalfa in the different regions of dryer 5. Mercury filled tubes such as 145 (FIG. 1B) convert each of the temperature sensors 147 to the appropriate controllers such as controller 149 (FIG. 8) of the forced flame burner units. The controllers 149 are referred to as "modulating type controllers" and control the flow of fuel to the burner units to maintain the sensed temperatures at preset levels.

Now that the major features of the solar collector section 3 of dehydrating system 1 have been described, it now will be convenient to describe the main features of dryer section 5 with reference to FIGS. 1, 2, 5A and 5B. Dryer section 5 has a plurality of exhaust blowers 25 installed on the roof thereof. In the present embodiment of the invention, each of the exhaust blowers 25 installed in the roof of the housing of dryer section 5 is implemented by means of a Model 3C073 blower, manufactured by Dayton and powered by a ¾ horsepower electric motor. Each of these exhaust blowers is capable of moving approximately 3000 cubic feet of air per minute.

As subsequently explained in more detail, since the freshly cut chopped hay indicated by reference numeral 53A is usually moist when it is at the inlet end (i.e., the left end) of dryer 5 (it typically has 72% to 82% moisture content), it is desirable that a much higher amount of air pass through the porous conveyor belts such as 11A, 11B (FIGS. 5A and 5B) in the directions indicated by arrows 55 than is the case on the right hand or outlet end of dryer 5, whereat the moisture content of the alfalfa has been reduced to a much lower value, for example, roughly 10% (6% if the dehydrated alfalfa is to be made into pellets, or 15% if it is to be made into meal). In order to accomplish this movement of a higher volume of heated air through the more moist alfalfa, the exhaust blower units 25 are spaced more closely together near the inlet end of dryer 5 than near the outlet end. For the left 400 feet of dryer 9, the exhuast blowers 25 are spaced 20 feet apart; for the next 400 feet, the exhaust blowers are spaced 25 feet apart, and for the last 300 feet, they are spaced 30 feet apart. In order to uniformly disperse the air being drawn upward through the conveyor belts 11, a perforated baffle plate 59 is provided approximately 12 to 18 inches below exhaust blower 25. The holes in the baffle plate 59 are roughly 3/16 inches in diameter and are spaced on 5/16 inch center lines.

Figure 2:
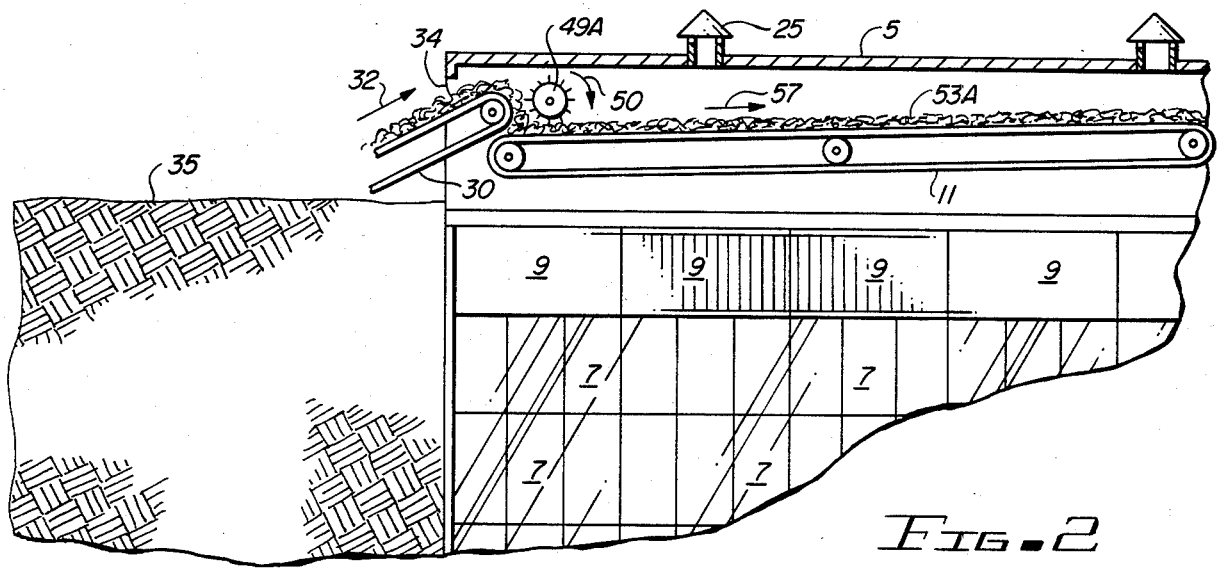
FIG. 2 is a partial cutaway front view of the dehydrating system of FIG. 1.

As indicated in FIG. 2, the moist chopped alfalfa is conveyed in the direction of arrow 32 into the inlet end of dryer 5 by means of inlet conveyor belt 30. The wet alfalfa moves in the direction of arrow 32 and flows through a pivotal "air lock brush" 34 that brushes over the top of the layer of wet chopped alfalfa on conveyor belt 30, thereby preventing excessive air from being drawn into the interior of dryer 5 through the inlet opening through which conveyor belt 30 extends. Air lock devices are common in negative pressure conveyor systems, and the one implemented herein is simple, yet effective. Use of air lock devices is, of course, necessary to maintain the "negative pressure" in the upper portion of the interior of dryer 5 in order to cause the heated air to flow upward through the perforated belts and through the wet alfalfa thereon in the direction indicated by arrows 55 in FIGS. 5A and 5B.

The height of the structure of dryer 5 is approximately 12 feet from the roof thereof to the bottom portion, wherein an auger screw 39 is provided to convey pieces of the alfalfa that drop off the conveyor belts 11 to the outlet end of dryer 5. Auger screw 39 actually includes approximately eleven sections, each of which is approximately one hundred feet long and each having a separate drive source or drive mechanism, as it is not practical to provide a single eleven hundred foot auger screw. The width of the dryer structure is approximately 4 feet, and as previously mentioned, the length is approximately 1100 feet. As best seen in FIGS. 5A and 5B, dryer 5 includes approximately nine long (approximately 150 feet) conveyor belts, such as 11A, 11B, . . . 11Q. Each of these conveyor belts is composed of porous steel belt material, the openings in the steel belt material having an average size of approximately 0.19 inches by 0.27 inches, there being 49 such openings per feet across the width of each belt and 36 openings per linear foot along the length of each belt in order to allow the heated air from the outlets of the burner sections 9 to easily move upward through the holes, as indicated by arrows 55, so that the heated air moves easily through the conveyor belts and then moves transversely through the damp chopped alfalfa which is being conveyed on the tops of each of the congeyor belts in the directions indicated by arrows 57. The width of each of the conveyor belts is approximately 4 feet. The five left belt assemblies each are approximately 100 feet long, and the remaining four belt assemblies are each approximately 150 feet long. Such porous belts can be obtained from Alloy Wire Belt Company of San Jose, Calif.

Each of the conveyor belts 11A, 11B, etc. is supported by means of a pair of end pulleys, such as 51A and 51B, each of which is approximately 24 inches in diameter. Additional idler pulleys (not shown) are supplied as needed to support the weights of the upper and lower portions of the conveyor belt and the chopped alfalfa thereon. If desired, tensioning pulleys such as 51C can be provided to properly adjust the tension in each of the conveyor belts.

In accordance with the present invention, the upper surface of each successive conveyor belt 11A, 11B, etc. moves to the right at a successively slower rate. During the 100 or 150 feet of travel of a piece of chopped alfalfa on the top surface of one of the conveyor belts, the upper surface of that conveyor belt (11A, 11B, etc.) rises approximately two feet. At the upper end of each conveyor belt, the chopped alfalfa thereon is dropped onto the lower end of the succeeding conveyor belt in order to thoroughly mix the chopped cotton, break up clumps thereof, and expose different areas of the chopped alfalfa pieces to the heated air currents 55. A plurality of leveling devices such as 49A and 49B, each of which includes a "peg drum" rotating clockwise, are utilized to break up clumps of moist alfalfa and uniformly spread the alfalfa on the surface of the corresponding conveyor belt so that the alfalfa is uniformly exposed to the heated air currents 55 and therefore drys uniformly.

Typically, the thickness of the chopped alfalfa 53A (FIG. 5A) on the first conveyor belt 11A is approximately three inches, and the upper surface of conveyor belt 11A might move in the direction indicated by arrow 57 at a speed of approximately 73 feet per minute. The upper surface of the next conveyor belt, i.e., conveyor belt 11B, would move in the direction indicated by arrow 57 at a slower rate, for example 54 feet per minute, and accordingly, the chopped alfalfa layer 53B deposited on the upper surface of conveyor belt 11B by belt 11A would be proportionately thicker, i.e., approximately four inches thick.

By the time the alfalfa has been dropped and been leveled approximately eight times on eight successive belts and has reached the last conveyor belt 11Q (FIG. 5B), the thickness of the layer 53Q of chopped alfalfa on the upper surface of conveyor belt 11Q is approximately 24 inches and its speed in the direction indicated by arrow 57 has been reduced to approximately only 10 feet per minute. At this point, the moisture content of the alfalfa at the right hand end of conveyor belt 11Q is less than roughly 10%. FIG. 10 graphically shows the thickness of the alfalfa layer on each of the conveyor belts, the belt speeds of each belt, and the approximate temperature maintained in each region by the appropriate gas burner section 9 and associated thermostatic sensors and controls.

The right hand end of conveyor belt 11Q extends out of an outlet opening, and the dehydrated alfalfa thereof indicated by reference numeral 61 is discharged into the chute 65 of FIG. 6, subsequently described. A pivotal air lock brush 63 (similar to air lock brush 34 previously described with reference to FIG. 2) minimizes the amount of outside air drawn into the interior of dryer 5, allowing the "negative air pressure" to be maintained inside dryer 5.

The entire amount of time that is required for chopped alfalfa to move from the inlet end to the outlet end of dryer 5 is expected to be roughly 55 minutes in the presently preferred embodiment of the invention. In accordance with the present invention, approximately 32 tons per hour of wet chopped alfalfa are fed into the inlet end of dryer 5, and approximately seven tons per hour of dehydrated chopped alfalfa having a moisture content of less than approximately 6% to 15% are ejected out of the outlet end of dryer 5 into the crusher machine 62 shown in FIGS. 6 and 7.

The rollers such as 51A, 51B, 51D, 51E, etc. on which the various conveyor belts 11A, 11B, etc. (FIG. 5A) are supported are driven by conventional chain and gear linkages, or, if it is desired to maintain precise control over the ratio of conveyor belt speeds, individually controlled electric motors can be provided to allow separate control of the belt speed of each respective conveyor belt. The diameters of each of the pulleys 51A, 51B, etc. supporting the conveyor belts 11A, 11B etc. are approximately 24 inches.

As best shown in FIG. 1B, pieces of alfalfa that happen to fall off of any of conveyor belts 11 hit the upper surface of sloped deflector plate 41 and fall down onto a "clean-up" auger screw 39 which, as previously mentioned, conveys all such pieces of alfalfa to the outlet end of dryer 5, preventing such pieces of alfalfa from accumulating on the floor of dryer 5. As previously mentioned, the gap between deflector plate 41 and a lower deflector plate 39 (through which gap the heated air flows from the burner units 9 into the interior of driver 5) is sufficiently narrow that the velocity of air drawn through the gap is high enough to prevent any dust particles or alfalfa particles from ever flowing backward from the interior of driver 5 into the combustion chambers of any of burner sections 9.

The above-mentioned "peg drum" leveling devices 49A, 49B, etc. (FIGS. 5A, 5B) are approximately 18 inches in diameter (6 inch drum and 6 inch pegs) and rotate clockwise at sufficiently fast rates to accomplish the function of breaking up clumps of alfalfa and spreading it uniformly across the surface of each of the conveyor belts 11.

Now that the structure of the dryer 5 and the conveyor belt system therein has been described, it will be convenient to briefly describe the farm machinery used in mowing and chopping the alfalfa, conveying it from the field to the dehydrator system 1, and metering it into dryer 5 by means of conveyor belt 30. For the presently preferred embodiment of the invention, the initial cutting of the alfalfa in the field is done by means of two machines referred to as "swathers", manufactured by Massey-Ferguson. These swathers cut a fourteen foot swath of the growing alfalfa and configure it into elongated "wind rows" on the alfalfa field. Immediately folowing the two swathers is a chopper machine, which can be implemented by means of Model 3960 devices which are manufactured by John Deere. The chopper machine picks up the wind rows of alfalfa from the field and chops it into pieces that are approximately two to four inches in length. These choppers also blow the chopped alfalfa into trailers that subsequently dump their loads into waiting dump trucks. The dump trucks then carry the wet chopped alfalfa to dehydrator system 1 and dump the chopped alfalfa from their dump bed 41 into a hopper 43, as indicated in FIG. 1A. A leveling and metering device 45 (FIG. 1A) conveys the chopped alfalfa from hopper 43 at a predetermined rate of approximately 32 tons per hour onto conveyor belt 30 which, as previously described, then conveys the wet alfalfa through the inlet opening of dryer 5 and deposits it on the left hand end of conveyor belt 11A. Hopper 43 has a slowly moving bottom surface, which may be comprised of a conveyor belt, which moves in the direction indicated by arrow 44 to feed the wet alfalfa on conveyor 30.

It should be noted that dehydrating system 1 has been designed to operate efficiently in conjunction with the above selection of farm machinery, so that during a normal work day, beginning before dawn and continuing until after sundown, dehydrating system 1 continually receives and dehydrates wet chopped alfalfa at roughly the same rate that a work crew of eight persons operating the above-described selection of farm machinery can swath the alfalfa, chop it, and carry it to and dump it into hopper 43. (Actually, I have designed dehydrating system 1 so that the above selection of farm machinery, when working at maximum expected efficiency, delivers approximately 1.3 times as much "green chopped" alfalfa to dehydrating system 1 as should be fed into conveyor 30. This "fudge factor" allows for various difficulties, such as machinery "down time" that can be reasonably expected to occur.)

Figure 6:
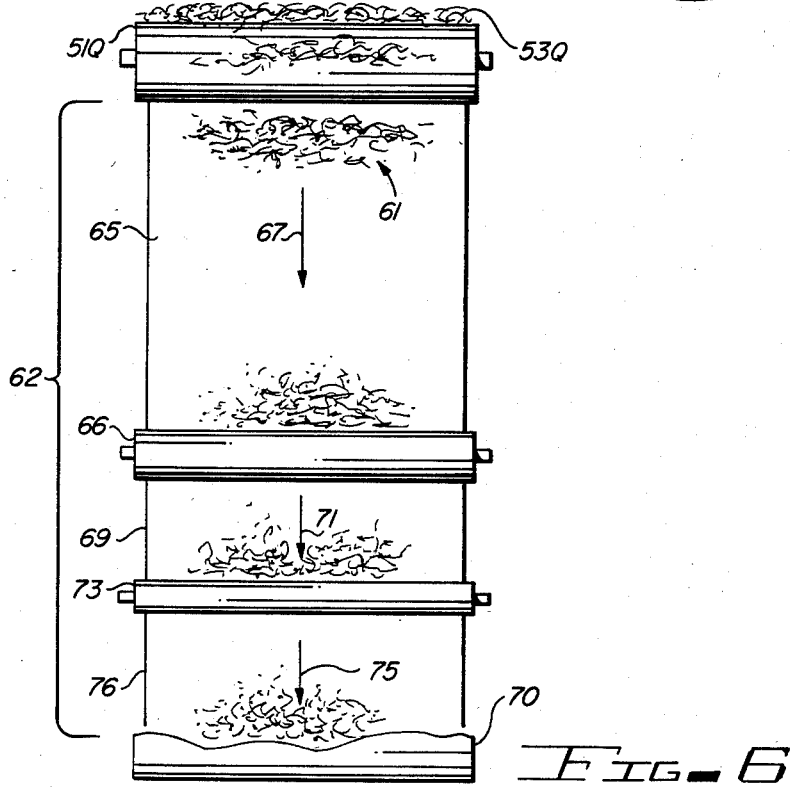
FIG. 6 is an elevation schematic diagram of a crusher system used at the outlet end of the dehydrating system of FIG. 1.

Next, it will be convenient to refer to FIGS. 6, 7A and 7B to describe the further process of separating the stem and leaf portions of the deydrated alfalfa into categories which have significantly different nutrient properties and significantly different optimum uses in the marketplace for dehydrated alfalfa products. Presently, commercially available dehydrated alfalfa, or "de-hy" is sometimes ground up into a mix containing approximately 50% small stem pieces and 50% small leaf pieces. As previously mentioned, alfalfa stems and leaves have different proportions of nutrients, and it is often desirable to separate them to obtain different feed materials with different nutrient proportions. Unfortunately, due to the fact that the stem pieces are small, the commercially available ground up product is not easily separated into relatively "pure" stem and leaf categories.

Referring now to FIGS. 6, 7 and 7A, the dehydrated alfalfa 61 is dropped out of the outlet end of dryer 5, in the direction indicated by arrow 67 in FIG. 6, into an upper chute 67, which feeds alfalfa 61 into a region between two closely spaced, rubber coated rollers generally designated by reference numeral 66 in FIG. 6, and individually designated by reference numerals 66A and 66B in FIG. 7. These rollers are 24 inches in diameter and 48 inches long in the described embodiment of the invention. They are positioned to achieve the desired pressure on the dehydrated alfalfa being crushed thereby.

The purpose of the crushing operation is to break, or at least fracture, the now brittle leaves of the dehydrated alfalfa without breaking the stems, in order to facilitate accurate subsequent separation of stem and leaf materials, which have different nutrient properties, different market values and different optimum utilization as food nutrients. The "handling" of the chopped alfalfa as it is conveyed along the successive conveyor belts in dryer 5, as previously described, is quite gentle and does not cause a significant amount of breaking of the alfalfa leaves. The stems and leaves of the chopped dehydrated alfalfa product 61 ejected from dryer 5 are very much intact when they are fed between rollers 66A and 66B. However, the alfalfa leaves at this point are dry and brittle enough that if they are subjected to sufficient distorting forces, they will fracture and break into various sized pieces. It is, of course, undesirable to break any of the stem material, since accurately separating stem material from leaf pieces will be more readily accomplished if the stem pieces are all large and the leaf pieces are all small.

I have found that by crushing the dehydrated alfalfa through the first pair of rollers 66A, 66B at pressure of approximately 100 lbs. per square inch, the stems (which contain a great deal of fiber) are flattened but are not broken into too many smaller pieces. This, of course, is highly desirable to facilitate subsequent accurate separation of stem and leaf pieces. The above crushing force does, however, cause extensive fracturing and some breaking of the brittle alfalfa leaves. The amount of breaking of the alfalfa leaves into separate leaf pieces by the first pair of rollers may be insufficient to facilitate optimum separation of stem and leaf materials. Therefore, I have found it desirable to guide the crushed alfalfa out of this space between rollers 66A and 66B through a peg drum 151 and into the region between a second pair of rollers generally designated by reference numeral 73 in FIG. 6 and individually by reference number 73A and 73B in FIG. 7, which further crush the dehydrated alfalfa material. The function of tines 153 of clockwise rotating peg drum 151 is to reorient the initially crushed alfalfa material so that the subsequent crushing operation will more effectively break the alfalfa leaves.

As indicated in FIG. 7, the chute 69 can be sloped in order to cause tumbling, fluffing, and reorientating of the initially crushed leaf particles so that when they pass through the second set of rollers 73A, 73B, again at approximately 100 lbs. per square inch pressure, their reoriented leaf particles will be subjected to the resulting additional stresses in different directions and, being already in a greatly fractured state, now will shatter into a very large number of small leaf pieces. Alternatively, alfalfa can be conveyed horizontally from rollers 66A, 66B to rollers 73A and 73B, in which case use of peg drum 151 is essential.

Meanwhile, the stem pieces, although they will be further flattened by the second crushing operation, remain mostly intact, since they are highly fibrous in content.

If necessary to achieve further breaking of the leaf pieces from the stems, additional rollers can be provided, and I anticipate that in many instances, further crushing will be required after the initial screen operation (subsequently described) to get the desired degree of breaking of leaf pieces apart and also causing removal of the leaves from the stem pieces. At the bottom of the final roller crushing stage, as shown in FIG. 7, the crushed stem and leaf pieces are conveyed by a final chute 76 onto a conveyor belt 77, which automatically conveys the stem and broken leaf pieces to the top of a separator assembly, subsequently described.

Before describing the separator assembly in detail, attention is directed to FIGS. 7 and 7A, wherein it can be seen that rollers 66A and 66B rotate clockwise and counterclockwise, respectively. Rollers 66A and 66B include, respectively, a metal drum 68A covered by a rubber sleeve 66A, and a metal drum 68B covered by a rubber sleeve 66B. The rubber sleeves frictionally engage the alfalfa material being crushed and increase the stresses thereon. The directions of rotation are indicated by arrows 85 and 85', respectively. In the described embodiment of the invention, I anticipate that rollers 66A and 66B will have diameters of approximately 24 inches, and will rotate at approximately 94 and 100 revolutions per minute, respectively. In FIG. 7B, dotted line 155 represents a mechanical coupling from the axle of roller 66B to an adjustable pressure drive, such as compression spring 156, 157 which is anchored to the frame of the crusher 60.

In order to achieve the fracturing and breaking of the alfalfa leaves in an optimum manner, I anticipate that in certain instances, it will be desirable to cause one of the rollers 66A and 66B to rotate at a slightly faster rate, for example, approximately six percent faster, than the other one, thereby imparting some shear stress to the alfalfa material being crushed. To this effect, FIG. 7 illustrates a control circuit 83 that can cause the two rollers 66A and 66B to rotate at slightly different speeds as a result of slightly different rotation rates of motors 84A and 84B, respectively. Similarly, I anticipate that it will be desirable in some instances to cause rollers 73A and 73B, which can be identical in diameter to rollers 66A and 66B, to rotate at slightly different speeds to improve the leaf breaking process, and to this effect, control system 83 can cause drive motors 84C and 84D to rotate at slightly different rates.

The separator system will now be described. The crushed dehydrated alfalfa material with shattered leaves is conveyed in the direction indicated by arrow 79 in FIG. 7 by means of conveyor belt 77 and is dropped into the top of separator assembly 87 in the direction indicated by arrow 81. Conveyor belt 77 has lugs 80 thereon to prevent the crushed alfalfa leaf and stem pieces from sliding backward on sloped belt 77.

In separator assembly 87, three sloped offset screens 91, 97 and 105 are provided. The openings in upper screen 91 are approximately 3/16 inches in diameter and the angle of inclination of screen 91 is roughly eight degrees.

The entire separator assembly 87 is caused to vibrate in a circular vibratory path. This causes the smallest leaf pieces, referred to as "fines", the large leaf pieces, and some small stem pieces (that may have broken loose from the larger stem pieces) to fall through the holes of upper screen 91 in a direction indicated by arrows 93 onto the second screen 97.

As the vibratory action of separator 87 continues, the stem pieces that remain on top of screen 91 gradually bounce downward in the direction indicated by arrow 95 in FIG. 7 to the lower end thereof wherein they tumble into a sloped gutter (or conveyor) 95, which causes the stems to slide toward one side of separator 87 onto a suitable conveyor or removal device. The small stem pieces and large leaf pieces that have fallen onto the top of second screen 97 remain on top of second screen 87, and bounce to the right in a direction indicated by arrow 101 and into a second sloped gutter (or conveyor) 103, while the medium sized alfalfa leaf pieces and the very small alfalfa fines pass through the openings in screen 97 in a direction indicated by arrows 99 and are deposited on top of the third screen 105. As the vibrating action continues, the small stem pieces and large leaf pieces move or bounce along the sloped surface of gutter (or conveyor 103) out of separator assembly 87 into a utilization device, not shown.

The medium sized leaf pieces that have fallen onto the top surface of third screen 105 bounce toward the lower end thereof in a direction indicated by arrow 109, and fall into a third sloped gutter (or conveyor) 111, while the fines fall through the openings in screen 105 in a direction indicated by arrow 107 onto a sloped bottom surface 113. The alfalfa fines bounce along the bottom surface 113 in a direction indicated by arrow 115 into a fourth sloped gutter or conveyor 117, which causes the fines to move out of separator 87 to a utilization device.

Vibrator 119 can be implemented by means of a Vibrox-Packer device manufactured by B. F. Cump Co. of Chicago, Ill.

The final part of the alfalfa harvesting operation would be to provide one or more pellet making mills for making suitable pellets out of the leaf materials obtained from the three gutters or conveyors 95, 102 and 111. Pellet mills are well known in the art, and can be obtained from such manufacturers as Borg-Warner. Alternatively, the segregated alfalfa materials can be ground up into meal materials or it can be cubed into small cubes.

I have found that if an extremely high degree of separation of alfalfa leaf pieces from alfalfa stem pieces is desired, it may be advantageous to apply a second crusher system, similar to roller crusher 60 shown in FIGS. 6 and 7, to the leaf material and small stem pieces that fall through a first screen (such as screen 91 in FIG. 7), which removes the largest stem pieces from the dehydrated alfalfa. FIG. 9 schematically represents the apparatus for doing this, wherein reference numeral 90 designates the output end of a chute or conveyor that collects the leaf pieces and small stem pieces represented by arrows 93 in FIG. 7 passing through a first screen such as screen 91 of FIG. 7. These small stem and leaf pieces move in the direction indicated by arrow 92 into a region between a pair of crusher rollers 137A and 137B, which can be substantially identical to crusher rollers 66A and 66B of FIGS. 6 and 7. Although it is not shown in FIG. 9, a chute such as 65 (FIG. 6) and a second pair of crusher rollers, such as 73A and 73B of FIG. 7 are provided. Again, the operation of the rollers, such as 137A and 137B further shatters and breaks all of the leaf pieces up into very small sized pieces without further breaking up the small stem pieces. The resulting mixture of small stem pieces and extremely small leaf pieces is conveyed by means of conveyor 77' onto a screen 91', which has very small holes therein. For example, the holes in screen 91' may be approximately 1/16 inches in diameter. Screen 91', which is vibrated by means of two eccentric wheels or shafts 131 and 136 at its opposed ends, sifts the alfalfa fines from the small stem pieces, which fall into sloped gutter or conveyor 95' and are conveyed to a suitable utilization device, such as a pellet mill. The fines fall in the directions indicated by arrows 93' and can be further sifted, if necessary. This crushing-screening-recrushing and re-screening operation results in an extremely pure leaf product with the highest possible porportion of these nutrients that are concentrated more highly in the alfalfa leaf pieces than in the alfalfa stem material.

The eccentric shafts 131 and 136, which rotate in the directions indicated by arrows 136, schematically illustrate an alternate (and more conventional) way of imparting vibrator motion to the separating screens than the approach shown in FIG. 7; this approach allows independent control of both the screen slope and the vibrating speeds and displacement transitions in a multi-screen separator system.

In accordance with one embodiment of the invention, a small portion of the wet hay from hopper 143 in FIG. 1A is removed and squeezed to obtain "alfalfa juice", which has a very high nutrient content, and is an excellent binder. This alfalfa juice then is used instead of water in the pellet mills to provide very high quality, high nutrient alfalfa pellets, which have roughly 18% moisture in them.

The above-described device is capable of providing dehydrated alfalfa in the forms of different separated "grades" of stem and leaf pieces at the rate of approximately 7 tons per hour. I have had extensive analysis performed on the four categories of separated alfalfa product material obtained from separator 87, and have found that much higher quality alfalfa product is obtained than has ever, to my knowledge, been produced before.

In accordance with one proposed embodiment of the invention, a liquid material known as Santoquin, manufactured by Monsanto, is sprayed on the wet alfalfa, preferably at the inlet end of dryer 5, to preserve the Vitamin A content of the dehydrated alfalfa product. It is known that continued exposure to light and oxygen causes the Vitamin A in alfalfa to deteriorate. Spraying of the Santoquin preservative increases the shelf life of both the stem material and the subsequently made pelleted leaf material.

Table 1 shows the results of an independent laboratory analysis of a freshly cut, freshly chopped, sample of alfalfa dehydrated by means of a prototype of the dehydrator described herein. The alfalfa of the sample was harvested in early February, 1982, and dried by means of solar heated air only, at an average air temperature of approximately 130° F. The material referred to as "alfalfa No. 1" was obtained from the top of the top screen 91, constituting 30% of the material fed to the separator. The "alfalfa No. 2" was obtained from the top of screen 97 and constituted approximately 25% of the dehydrated alfalfa fed into separator 87; the "alfalfa No. 3" was the material that remained on the top of the screen 105, and constituted approximately 30% of the dehydrated alfalfa fed into separator 87. Finally, the material designated "alfalfa No. 4" constituted the "fines" obtained from the floor 113 and constituted approximately 15% of the dehydrated alfalfa fed into separator 87. Table No. 1 shows the composition of the above four grades of separated alfalfa material with respect to percentages of moisture, protein, fat, fiber, calcium, phosphorous, and ash.

Table 2 shows an analysis of a mixture of equal parts of the "alfalfa No. 3" and "alfalfa No. 4" from the same sample represented by Table No. 1 and also shows the same analysis for standard "17% alfalfa" purchased from a supplier. The "17% alfalfa" is a standard against which alfalfa nutrient content can be measured. The "17%" refers to the typical percentage of protein in that type of product. This sample was partially field cured and then dehydrated by a conventional gas powered dehydrating system of the type referred to previously (with inlet temperatures of approximately 1600° F.). The two columns in Table 2 are headed "Alfalfa Nos. 3 and 4" and "17% standard Alfalfa". The first column of Table 2 lists the ingredients and the numbers under the second and third columns indicate the percentages of the various ingredients in the material produced by my prototype dehydrating system and the percentages of the ingredients in standard commercially available 17% alfalfa.

I have reason to believe, on the basis of information I have obtained from various sources, that the high nutrient content of my product, as indicated in Tables 1 and 2, will be attained for inlet temperatures as high as approximately 650° at the high moisture inlet end of dryer 5. However, I expect that for optimum economy and efficiency, the dehydrator system 1 should be operated so that the average temperature of air drawn from the solar collector and gas burner system into a particular region of the interior of dryer 5 is equal to or only slightly greater than the maximum temperature to which the air is preheated by solar collector 3 during the hottest part of the day, if this gives a sufficiently great alfalfa throughput rate for dehydrating system 1 in order to prevent too much wet chopped alfalfa from building up in hopper 43 of FIG. 1A. In the early morning hours, before the sun is up, and in the late evening hours, all of the air heating will be provided by the gas burner sections 9. It is highly desirable that the air not be heated to any higher temperature by gas burners 9 than is necessary to maintain an adequate throughout rate, since when this heated air has passed through the chopped alfalfa on the conveyor belts 11 and has been exhausted out into the atmosphere, the heat therein is essentially wasted. Nevertheless, it is necessary to be able to maintain the throughput rate of wet alfalfa at a roughly constant rate determined by the rate at which the above-described mowing, chopping, and delivery equipment usually delivers freshly mown and chopped wet alfalfa to hopper 43 in order to make the entire operation economical, efficient, and feasible.

While the invention has been described with reference to a particular presently preferred embodiment thereof, those skilled in the art will be able to recognize numerous variations to the described structure and method and product that do not depart from the true spirit and scope of the invention. Although the system described has been designed particularly for utilization in efficiently dehydrating alfalfa to obtain a much lower cost, higher nutrient content dehydrated alfalfa product that has ever been obtained before, at least from high temperature conventional gas fired dehydrating systems, it is expected that with slight alterations, the dehydrator system 1 will be very useful for dehydrating other agricultural products, such as vegetable and particularly seaweed (which presently is beach cured by the sun, causing a very substantial loss of nutrients. Seaweed is becoming an important source for pectin, a stiffening agent which is widely used in jellies and other food products). It should be appreciated that variation in outside air humidity or moisture content of the incoming alfalfa fed into dryer 5 will have to be conpensated for by varying one or more of the variables, including the heated dehydrating air temperatures, alfalfa layer thicknesses, belt speeds, air flow ratios, etc. to maintain an essentially constant throughout rate. A moisture sensor at the outlet end could be provided to determine the actual moisture content of the ejected alfalfa. This information could be automatically electrically provided to automatically adjust one or more of the above variables.

TABLE 1

| INGREDIENT | ALFALFA NO. 1 | ALFALFA NO. 2 | ALFALFA NO. 3 | ALFALFA NO. 4 |
|---|---|---|---|---|
| % Moisture | 6.68 | 5.52 | 5.48 | 5.68 |
| % Protein | 15.7 | 23.4 | 29.1 | 33.0 |
| % Fat | 0.92 | 1.00 | 1.00 | 1.60 |
| % Fiber | 32.7 | 22.6 | 14.3 | 10.8 |
| % Calcium | .80 | 1.27 | 1.54 | 1.70 |
| % Phosphorus | 0.28 | 0.36 | 0.38 | 0.41 |
| % Ash | 10.2 | 11.9 | 12.4 | 12.3 |

TABLE 2

| INGREDIENT | ALFALFA 3 & 4 | 17% ALFALFA |
|---|---|---|
| Protein | 31.05 | 17.50 |
| Fat | 1.30 | 2.00 |
| Fiber | 12.00 | 24.10 |
| Swine Me (kcal/kg) | 2870.00 | 1353.00 |
| Poultry Me (kcal/kg) | 2870.00 | 1370.00 |
| Arginine | 1.62 | 0.80 |
| Lysine | 1.65 | 0.73 |
| Methionine | 0.52 | 0.23 |
| MET + Cys | 1.04 | 0.43 |
| Tryptophan | 0.00 | 0.28 |
| Glycine | 1.63 | 0.90 |
| Phenylalanine | 1.70 | 0.79 |
| Tyrosine | 0.86 | 0.56 |
| Valine | 1.70 | 0.84 |
| Leucine | 2.44 | 1.26 |
| Isoleucine | 1.36 | 0.84 |
| Threonine | 1.55 | 0.70 |
| Histidine | 0.66 | 0.32 |
| Vitamin A (IU/kg) | 200000.00 | 110000.00 |
| Vitamin D3 (IU/kg) | 0.00 | 0.00 |
| Vitamin E (IU/kg) | 125.00 | 125.00 |
| Vitamin B12 (mg/kg) | 0.00 | 0.00 |
| Vitamin K (mg/kg) | 25.00 | 24.64 |
| Riboflavin (mg/kg) | 14.00 | 13.60 |
| Niacin (mg/kg) | 38.00 | 38.00 |
| Pantothenate (mg/kg) | 25.00 | 25.00 |
| Choline (mg/kg) | 1400.00 | 1401.00 |
| Thiamin (mg/kg) | 3.40 | 3.40 |
| Folic Acid (mg/kg) | 4.20 | 4.20 |
| Pyridoxine (mg/kg) | 6.50 | 6.50 |
| Biotin (mg/kg) | 0.30 | 0.30 |
| Xanthophylls (mg/kg) | 240.00 | 171.60 |

TABLE 2-continued

| INGREDIENT | ALFALFA 3 & 4 | 17% ALFALFA |
|---|---|---|
| Calcium | 1.62 | 1.44 |
| Phosphorous | 0.40 | 0.22 |
| Avail. Phosphorus | 0.13 | 0.07 |
| Zinc (mg/kg) | 24.00 | 24.00 |
| Manganese (mg/kg) | 30.00 | 30.00 |
| Magnesium | 0.36 | 0.36 |
| Sodium | 0.12 | 0.12 |
| Potassium | 2.18 | 2.17 |
| Iron | 0.05 | 0.05 |
| Copper (mg/kg) | 10.20 | 10.20 |
| Palmitic Acid | 0.00 | 0.00 |
| Stearic Acid | 0.00 | 0.00 |
| Oleic Acid | 0.00 | 0.00 |
| Linoleic Acid | 0.00 | 0.00 |
| Linolenic Acid | 0.00 | 0.00 |
| Selenium (mg/kg) | 0.34 | 0.34 |
| Vanadium (ppm) | 0.00 | 0.00 |
| Weight (kg) | 1.00 | 1.00 |

I claim:

1. A method of operating a dehydrating system to dehydrate freshly chopped alfalfa, said method consisting essentially of the steps of:
   (a) conveying fresh chopped alfalfa through a dryer shed on a plurality of porous conveyor belts;
   (b) transferring alfalfa from a downstream end of one conveyor belt to an upstream end of the next conveyor belt;
   (c) heating a plurality of separate adjacent dry air streams to a plurality of predetermined temperatures and passing the heated dry air streams simultaneously upwardly through adjacent portions of said porous conveyor belts and the alfalfa thereon at a plurality of adjacent predetermined regions in the dryer shed whereby the heated air streams pass through said porous belt and the alfalfa thereon before passing through an upstream portion of the alfalfa;
   (d) causing fast drying portions of alfalfa leaf pieces that become separated from the rest of the alfalfa to fall downward through the porous conveyor belts into a separate conveyor region which is outside of the path of the air streams;
   (e) removing the separated fast drying leaf pieces from the dryer separately from the alfalfa on the conveyor belts;
   (f) moving alfalfa from the dryer shed into a plurality of pairs of rollers, and operating the rollers to apply shear forces sufficient to crush the alfalfa stems and to fracture and shatter the alfalfa leaves, into minute leaf pieces that are much smaller than substantially all of the stem pieces;
   (g) passing the alfalfa material into a screen separating device; and
   (h) operating the screen separating device to separate the minute leaf pieces from the crushed alfalfa stems thereby providing an alfalfa leaf product consisting of minute alfalfa leaf pieces having high levels of protein, carotene, and xanthophylls and low fiber content.

2. The method of claim 1 wherein the temperatures of the dry air streams are in the range from 100° Fahrenheit to 650° Fahrenheit.

3. The method of claim 1 including preheating the dry air streams by means of a solar collector before step (c) and performing the heating of step (c) by means of a plurality of gas heaters.

4. The method of claim 1 wherein the predetermined temperatures, the flow rates of said dry air streams, the speeds of said successive conveyor belts, and the sizes of the adjacent regions of the dryer shed have values which cause the alfalfa emerging from the dehydrating system to have a moisture content in the range of approximately 6% to 15%.

5. The method of claim 1 wherein step (f) includes applying an amount of force between each of said pairs of rollers sufficient to fracture and/or break leaf pieces of the alfalfa without causing substantial breaking of the alfalfa stems.

6. The method of claim 5 wherein step (f) includes operating the plurality of pairs of rollers by applying sufficient force therebetween and sufficient differences in surface speeds thereof to produce crushing and stem stresses sufficient to ensure that substantially all of the alfalfa leaf pieces are broken into minute alfalfa leaf pieces which are substantially smaller than essentially all of the alfalfa stem pieces.

* * * * *

UNITED STATES PATENT AND TRADEMARK OFFICE
CERTIFICATE OF CORRECTION

PATENT NO. : 4,559,235
DATED : Dec. 17, 1985
INVENTOR(S) : John T. Miller

It is certified that error appears in the above-identified patent and that said Letters Patent are hereby corrected as shown below:

```
In Claim 1, line 6, after "one", insert --porous--;
            line 7, after "next", insert --porous--;
            line 15, after "whereby", insert --none of--;
            line 25, after "dryer", insert --shed--, and
            after "on the", insert --porous--.
```

Signed and Sealed this

Thirtieth Day of September 1986

[SEAL]

Attest:

DONALD J. QUIGG

Attesting Officer

Commissioner of Patents and Trademarks